F. B. DAVIS.
Nut-Lock.
No. 199,191.  Patented Jan. 15, 1878.
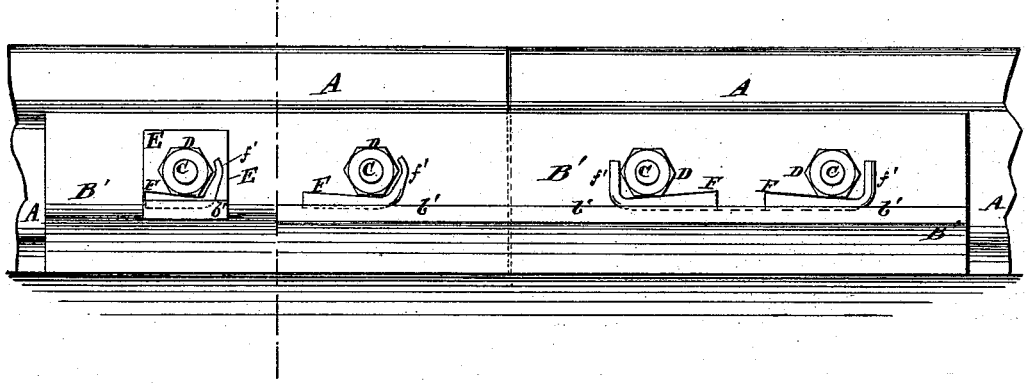
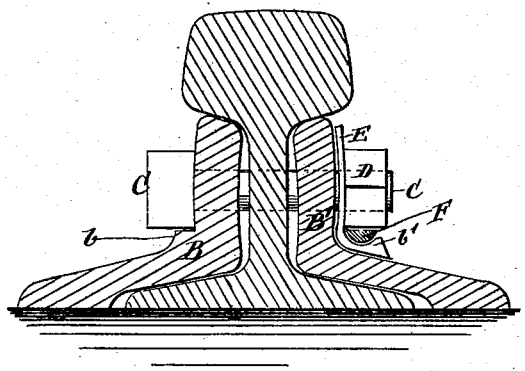 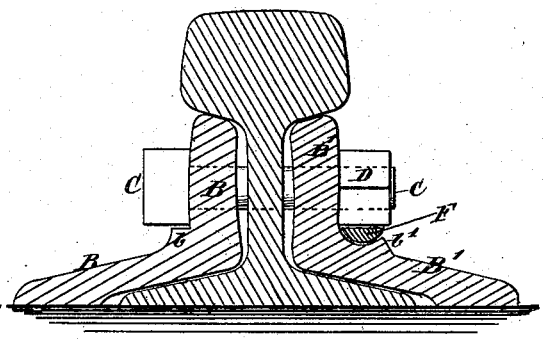

UNITED STATES PATENT OFFICE.

FRANK B. DAVIS, OF JOHNSTOWN, PENNSYLVANIA, ASSIGNOR TO CAMBRIA IRON COMPANY, OF SAME PLACE.

IMPROVEMENT IN NUT-LOCKS.

Specification forming part of Letters Patent No. 199,191, dated January 15, 1878; application filed November 14, 1877.

*To all whom it may concern:*

Be it known that I, FRANK B. DAVIS, of Johnstown, in the county of Cambria and State of Pennsylvania, have invented a new and Improved Nut-Lock, of which the following is a specification:

The object of my invention is to provide a simple and effective device for preventing nuts and bolts used on fish-plates or splice-bars of rails, or for other similar purposes, from getting loose by accidentally turning and unscrewing.

In the accompanying drawing, Figure 1 represents a side view of a rail-joint with my improvement applied. Figs. 2 and 3 are cross-sections of the same.

Similar letters of reference indicate corresponding parts.

A are the rails. B B' are the splice-bars, one on each side, securing the two rails together by means of the bolts C and their nuts D.

The bolts C are kept from turning in the holes made for them through the splice-bars and rail by being made to rest with one side of the bolt-head flush, or nearly so, against or upon a rib or shoulder, $b$, formed upon or attached to the splice-bar B, as seen in Figs. 2 and 3.

The splice-bar B' is provided with a similar rib, $b'$, preferably formed on the bar in the rolling, like the rib $b$, either continuous or at intervals; or the rib or shoulder $b$ $b'$ may be formed upon a washer, E, held on the bolt C by the nut D, and resting, to prevent its turning, on the flange of the rail or of the splice-bar.

The distance between the bolt-hole and the rib $b'$ should be large enough to allow of the nut D being turned on the bolt C, and, when sufficiently tightened, presenting one of its sides to the rib $b'$. This being done, the nut is prevented from turning out of this position by a wedge, F, being inserted between the nut and the rib $b'$.

The key F is a wedge-key, and held in place by its thinner end being turned up on the side of the nut, as shown. In order to prevent the key F from slipping out sidewise, I form a groove on the rib $b'$ to receive it, as shown in Figs. 2 and 3.

Having thus described my invention, I claim as new and desire to secure by Letters Patent—

A lock-nut in which a wedge, F, is passed with its smaller end between a polygonal nut and a bar, $b'$, until its inclined surfaces contact with both, the smaller end of said wedge being then turned about the nut, as shown and described.

FRANK B. DAVIS.

Witnesses:
   J. H. GEER,
   M. B. FISHER.